United States Patent Office 3,168,513
Patented Feb. 2, 1965

3,168,513
DERIVATIVE OF 2'-DEOXY-5-FLUOROURIDINE
Robert Duschinsky, Essex Fells, N.J., assignor to Hoffmann-La Roche Inc., Nutley, N.J., a corporation of New Jersey
No Drawing. Filed Mar. 2, 1962, Ser. No. 176,892
4 Claims. (Cl. 260—211.5)

This invention relates, in general, to a novel derivative of 1-($\beta$-D-2-deoxyribofuranosyl)-5-fluorouracil. More particularly, the invention relates to the 3',5'-diacetate of 1-($\beta$-D-2-deoxyribofuranosyl)-5-fluorouracil and to the preparation and the use thereof.

1-($\beta$-D-2-deoxyribofuranosyl)-5-fluorouracil or, as it will be referred to hereinafter throughout the specification and in the claims, 2'-deoxy-5-fluorouridine, is a known compound. It is useful, for example, as an antibacterial agent and as an antifungal agent. Additionally, 2'-deoxy-5-fluorouridine functions as an antimetabolite, that is, it interfers with nucleic acid metabolism and, thus, inhibits the growth of cells, particularly tumor cells.

As it is obtained from presently known procedures, 2'-deoxy-5-fluorouridine often contains varying, and sometimes substantial, amounts of 5-fluorouracil. The present invention provides a convenient and efficient means for separating 2'-deoxy-5-fluorouridine from a mixture containing 2'-deoxy-5-fluorouridine and 5-fluorouracil. Basically, the procedure that is employed to accomplish such separation involves two steps, namely (1) the conversion of the crude 2'-deoxy-5-fluorouridine into its 3',5'-diacetate derivative, that is, into 5-fluoro-2'-deoxy-3',5'-di-O-acetyluridine, and (2) the subsequent regeneration of 2'-deoxy-5-fluorouridine by hydrolysis of the diacetylated intermediate. For the sake of convenience, the expression "crude 2'-deoxy-5-fluorouridine" will be used herein to denote a product which contains a mixture of 2'-deoxy-5-fluorouridine and 5-fluorouracil.

Moreover, and apart from the aspect of the invention described in the immediately preceding paragraph, it has been found that 5-fluoro-2'-deoxy-3',5'-di-O-acetyluridine provides a repository for the therapeutically valuable 2'-deoxy-5-fluorouridine. When administered orally, 2'-deoxy-5-fluorouridine is metabolized to 5-fluorouracil and to degradation products of the latter, such as, dihydrofluorouracil, $\alpha$-fluoro-$\beta$-ureidopropionic acid and $\alpha$-fluoro-$\beta$-alanine. Only a small proportion of the biologically effective 2'-deoxy-5-fluorouridine can be found in body fluids, such as, blood and urine, after its oral administration. When, however, 5-fluoro-2'-deoxy-3',5'-di-O-acetyluridine is given orally, a substantially higher proportion of 2'-deoxy-5-fluorouridine is found in the body fluids. This indicates that 5-fluoro-2'-deoxy-3',5'-di-O-acetyluridine functions, by hydrolysis, as a precursor of 2'-deoxy-5-fluorouridine and that its use permits one to obtain concentrations of the therapeutically active 2'-deoxy-5-fluorouridine which cannot be obtained by the oral administration of 2'-deoxy-5-fluorouridine itself.

Thus, in its most comprehensive embodiment, the present invention resides in 5-fluoro-2'-deoxy-3',5'-di-O-acetyluridine as a new and useful compound. In a more limited embodiment the present invention resides both in the use of 5-fluoro-2'-deoxy-3',5'-di-O-acetyluridine as an intermediate for the preparation of pure 2'-deoxy-5-fluorouridine from crude 2'-deoxy-5-fluorouridine and in 5-fluoro-2'-deoxy-3',5'-di-O-acetyluridine as a precursor for 2'-deoxy-5-fluorouridine in biological systems.

In the practice of the present invention, 2'-deoxy-5-fluorouridine can be converted into the desired 5-fluoro-2'-deoxy-3',5'-di-O-acetyluridine by any conventional acetylation procedure of the art. Moreover, the conversion of 5-fluoro-2'-deoxy-3',5'-di-O-acetyluridine to 2'-deoxy-5-fluorouridine can be accomplished by any known hydrolysis procedure. Preferred procedures for converting 2'-deoxy-5-fluorouridine, either pure or crude, into 5-fluoro-2'-deoxy-3',5'-di-O-acetyluridine and for hydrolyzing the latter compound into 2'-deoxy-5-fluorouridine will be described in full hereinafter.

Thus, in the preparation of 5-fluoro-2'-deoxy-3',5'-di-O-acetyluridine, 2'-deoxy-5-fluorouridine, either pure or crude, is reacted with an acetylating agent in the presence of an alkali, such as, pyridine or dimethylaniline. As the acetylating agent, acetic anhydride is preferably employed. Other acetylating agents, such as, acetyl chloride, can be used, however, if desired. While the reaction system must be provided with a ratio of at least 2.0 moles of acetylating agent for each mole of 2'-deoxy-5-fluorouridine present therein, it is preferred to employ in excess of 2.0 moles of acetylating agent for each mole of 2'-deoxy-5-fluorouridine in use.

The reaction of the 2'-deoxy-5-fluorouridine with the acetylating agent is exothermic in nature and, hence, it can be initiated merely by mixing the reactants at room temperature. Throughout the reaction, the reaction mixture is preferably cooled, by any apropriate means, so as to maintain the temperature thereof within the range of from about 20° C. to about 40° C. The reaction is permitted to proceed to completion with continuous stirring. Diacetylation of the 2'-deoxy-5-fluorouridine is complete when the temperature of the reaction mixture tends to remain constant at room temperature, without externally cooling same.

In carrying out the invention, 2'-deoxy-5-fluorouridine can be diacetylated in the presence of a solvent. In general, one can use any inert organic solvent in which both of the starting materials, that is, 2'-deoxy-5-fluorouridine and the acetylating agent, as well as the final product, namely, 5-fluoro-2'-deoxy-3',5'-di-O-acetyluridine, are soluble. Inert organic solvents which are non-polar in nature, for example, chloroform, methylene chloride, etc., have been found to be especially well suited for use. The solvent preferably employed, however, is methylene chloride.

The 5-fluoro-2'-deoxy-3',5'-diacetyluridine which is produced by the foregoing procedure can be readily isolated by any convenient method. In one such method, the reaction mixture which contains the 5-fluoro-2'-deoxy-3',5'-di-O-acetyluridine is poured into cold water. Where the reaction mixture does not contain an inert, non-polar organic solvent, crystallization of the diacetylated product may occur when the reaction mixture is added to cold water. Crystallization of the 5-fluoro-2'-deoxy-3',5'-di-O-acetyluridine at this stage can be avoided by adding the reaction mixture to a mixture of water and a water-immiscible organic solvent in which the diacetylated product is soluble. For example, the reaction mixture may be added to a mixture of water and methylene chloride. In any event, if crystallization does take place at this stage, the crystals which do form may be removed by filtration. In the alternative, these crystals may be removed in the next step of the process, when the aqueous solution is extracted with an inert, water-immiscible organic solvent in which 5-fluoro-2'-deoxy-3',5'-di-O-acetyluridine is soluble. For example, where the reaction has been carried out in the absence of a water-immiscible organic solvent, the aqueous solution, which is obtained when the reaction mixture is poured into cold water, is extracted with a solvent such as chloroform or methylene chloride. The aqueous phase is subsequently separated from the organic solvent phase and the former is discarded. The organic solvent solution of 5-fluoro-2'-deoxy-3',5'-di-O-acetyluridine is then washed with a dilute mineral acid, for example, sulfuric acid, hydrochloric acid, etc. Subsequently, the organic solvent phase is washed with a cold solution of a weak base, for example, with a cold, saturated solution of sodium bicarbonate. Thereafter, the organic solvent solution of 5-fluoro-2'-deoxy-3',5'-di-O-acetyluridine is washed with water, dried, for example, over sodium sulfate, and evaporated to dryness. The residue which remains after the solvent has been removed, namely, 5-fluoro-2'-deoxy-3',5'-di-O-acetyluridine, can, if desired, be redissolved in a suitable solvent, for example, in ether, following which said solvent can be removed by evaporation. The residue which remains after removal of the solvent is dried in vacuo at a temperature of from about 30° C. to 50° C. to yield crystalline 5 - fluoro - 2' - deoxy-3',5'-di-O-acetyluridine.

In the immediately preceding paragraph, there is discussed the manner in which 5-fluoro-2'-deoxy-3',5'-di-O-acetyluridine is isolated from a reaction system which does not contain a water-immiscible solvent. A somewhat analogous isolation procedure is used where the diacetylation of 5-fluoro-2'-deoxyuridine has been carried out in a system containing an inert, water-immiscible organic solvent in which the 5-fluoro-2'-deoxy-3',5'-di-O-acetyluridine is soluble. In such a case, the reaction mixture is added to cold water, as in the previously described procedure, but, however, little or no crystallization of 5-fluoro-2'-deoxy-3'-5'-di-O-acetyluridine will occur. Thereafter, the aqueous phase is separated from the organic solvent phase, the aqueous phase is extracted with a water-immiscible inert organic solvent in which the 5-fluoro-2'-deoxy-3',5'-di-O-acetyluridine is soluble and the extracts, thus obtained, are added to the previously separated solvent phase. Generally, the same solvent will be used in this extraction step as has been used in carrying out the reaction. The organic solvent phase, including the extracts, is washed with acid, subsequently with a base, and then with water, dried and crystallized, each of the foregoing steps being carried out in the manner described heretofore.

Where it is desired to utilize the present invention as a means for obtaining pure 2'-deoxy-5-fluorouridine from crude 2'-deoxy-5-fluorouridine, the crude product is subjected to diacetylation in the manner heretofore described. Acetylation of the 5-fluorouracil component of the crude product does not occur. Diacetylation of the 5-fluoro-2'-deoxyuridine component of the crude product does take place to yield 5-fluoro-2'-deoxy-3',5'-di-O-acetyluridine. The latter is isolated from the reaction system by the previously described method and it is hydrolyzed to yield the desired 2'-deoxy-5-fluorouridine. Hydrolysis of the diacetylated product can be easily accomplished. In general, any conventional hydrolysis procedure, utilizing either an acid or a base as the hydrolyzing agent, may be employed. In a particular embodiment of this invention, the diacetylated product is hydrolyzed as follows: 5-fluoro-2'-deoxy-3',5'-di-O-acetyluridine is suspended in a lower aliphatic monohydroxy alcohol, such as, methanol, ethanol, etc. To this suspension is added, for example, a dilute solution of sodium methoxide in methanol. The reaction mixture is cooled, with stirring, to a temperature below room temperature, for example, to a temperature of about 5° C. The reaction mixture is subsequently adjusted with an acid, such as methanolic hydrogen chloride, to about pH 6.0 and evaporated to dryness in vacuo. The residue is extracted several times, at an elevated temperature, with a solvent such as acetone. The extracts are combined and concentrated, in vacuo, until crystallization commences. At this stage, petroleum ether is added to the concentrate and mixed therewith. The mixture is rapidly cooled and, after standing, the crystals which have formed are removed by filtration. By further concentrating the mixed solvent systems, additional crops of crystalline 2'-deoxy-5-fluorouridine may be obtained. The crystalline product, thus obtained, may be further purified by crystallization from a suitable solvent, such as, butyl acetate.

In an alternate procedure, diacetylation of 5-fluoro-2'-deoxy-3',5'-di-O-acetyluridine can be carried out as follows: The diacetyl compound is first suspended in cold methanol and a cold saturated solution of hydrogen chloride gas in methanol is added thereto. The suspension is agitated at room temperature until a clear solution is obtained. This solution is evaporated, in vacuo, at a temperature of 30° C., yielding an amorphous, almost colorless, froth which is then dissolved in ethanol. Crystallization of 2'-deoxy-5-fluorouridine from this solution can be accomplished readily by adding petroleum ether thereto, accompanied by scratching and/or seeding with pure 2'-deoxy-5-fluorouridine. The crystalline 2'-deoxy-5-fluorouridine, thus obtained, may, thereafter, be recrystallized from a suitable solvent, for example, from butyl acetate.

It will be understood that the methods described herein for producing and isolating 5-fluoro-2'-deoxy-3',5'-di-O-acetyluridine and for hydrolyzing 5-fluoro-2'-deoxy-3',5'-di-O-acetyluridine and recovering 2'-deoxy-5-fluorouridine are given by way of example only. Variations in the described procedure, as well as alternate methods for accomplishing the desired results, will be readily apparent to those skilled in the art. Broadly stated, the present invention embraces 5-fluoro-2'-deoxy-3',5'-di-O-acetyluridine and its production by conventional procedures, as well as the hydrolysis of the diacetylated product, by known procedures, to obtain pure 2'-deoxy-5-fluorouridine.

As has been indicated heretofore, the present invention is of significant importance for two reasons. First, it provides an improved method for separating 2'-deoxy-5-fluorouridine from 5-fluorouracil. Diacetylation of crude 2'-deoxy-5-fluorouridine, the method through which such separation is accomplished, and the subsequent hydrolysis of the 3',5'-diacetyl compound is the procedure by which pure 2'-deoxy-5-fluorouridine is obtained. Secondly, the invention provides a valuable repository of 2'-deoxy-5-fluorouridine. Since 5-fluoro-2'-deoxy-3',5'-di-O - acetyluridine is hydrolyzed in biological systems, it acts as a precursor for, and permits more effective and efficient utilization of, the therapeutically valuable 2'-deoxy - 5-fluorouridine.

For a fuller understanding of the nature and objects of this invention, reference may be had to the following examples which are given merely as further illustrations of the invention and are not to be construed in a limiting sense.

Example 1

5.0 grams of pure 2'-deoxy-5-fluorouridine (0.02 mole) were dissolved in 200 ml. of dry pyridine. To this solution, 75.0 ml. of acetic anhydride was added. With continuous cooling, the reaction mixture was maintained at about room temperature for a period of about 17 hours. Thereafter, the mixture was poured into 750 ml. of ice water. The solution, thus obtained, was extracted six times, each time using 50 ml. of chloroform. The combined chloroform extracts were washed four times, each time using 50 ml. of cold 0.3 N sulfuric acid. Thereafter, the combined extracts were washed first, using 50 ml. of aqueous sodium bicarbonate solution, and subsequently, 50 ml. of ice water. The chloroform extracts were then dried over anhydrous sodium sulfate and evaporated to dryness.

The residue remaining after all of the solvent had been removed was dissolved in 50 ml. of ether. The solution was then evaporated to dryness. This procedure was repeated two times. The residue obtained was dried in vacuo at a temperature of 40° C.

The 5-fluoro-2'-deoxy-3',5'-di-O-acetyluridine, thus obtained, was crystalline in nature, melting at 151.5° C. to 152° C.

It analyzed as follows.—Calculated: C, 47.27; H, 4.58; N, 8.48. Found: C, 47.24; H, 4.94; N, 8.62.

Example 2

Cells of *Escherischia coli* were grown in a synthetic minimal medium containing salts and glucose as the only carbon sources. This medium, and the growing of *Escherichia coli* cells therein, is described by S. S. Cohen and R. J. Abrogast in J. Exp. Med., 91, 619 (1950). After 24 hours of incubation the cells were harvested by centrifugation. Thereafter, the collected cells were washed several times with water following which they were ground with alumina to a pasty consistency. The cells were then extracted using 4 ml. of water per gram of wet cells. The crude extract was then centrifuged at 25,000 times gravity and a viscous, yellowish supernatant was obtained.

Thereafter, 214.0 grams (1,645 mM.) of 5-fluorouracil and 400.0 grams (1,645 mM.) of thymidine were added to 36.5 liters of a solution containing 179 grams of tris buffer (trihydroxymethylaminomethane), pH 8.0. Subsequently, 82.0 mg. of potassium phosphate ($KH_2PO_4$) was added to the buffered 5-fluorouracilthymidine solution. The combined solution was adjusted to about pH 8.0 using potassium hydroxide. The crude enzyme preparation, the preparation of which is described in the preceding paragraph, was then added to the solution. The enzyme preparation was added in an amount equivalent to about 70.0 grams of wet cells. The mixture was incubated at a temperature of about 37° C. for a period of about 40 hours. At the end of that period of time, the enzyme was inactivated by the addition of 1.3 liters of 71% perchloric acid. The reaction mixture was allowed to stand at room temperature for a period of about 30 minutes, following which the precipitated protein solids were removed by filtration.

The filtrate, thus obtained, was passed through a column containing "Dowex 1–X4" chloride (100–200 mesh). Dowex 1–X4 chloride is an anion exchange resin consisting of a cross-linked copolymer of styrene and divinyl benzene. It is sold commercially by Dow Chemical Company, Midland, Michigan. Prior to its use, 20 kgs. of the resin were mixed with 10 liters of 5 N sodium hydroxide and washed first by decantation and then on a ceramic filter with 600 liters of distilled water until its pH was about 11.0. The resin was then mixed with 9 liters of hydrochloric acid and washed with 250 liters of water until its pH was about 5.0. Thereafter, the resin was washed once again with alkali, that is, with 5 N sodium hydroxide, as heretofore described, and subsequently with acid, that is, with hydrochloric acid, in the manner previously described. The resin was then mixed with 10 liters of 1 N ammonium chloride and washed with 75 liters of water until the pH thereof was about 6.0. Finally, the resin was mixed with 9 liters of hydrochloric acid and washed with 300 liters of distilled water until neutral in reaction. The resin was then sludged up in about 15 liters of distilled water, poured into a glass column, 177 cm.$^2$ x 200 cm. and backwashed.

The filtrate was poured into the column containing the exchange resin and eluted using aqueous ammonium chloride. Fractions of 3.5 liters were taken at 30 minute intervals. Each fraction was examined individually for ultraviolet absorption. The following fractions were obtained:

The fractions designated as fraction 96 to 100, inclusive, in the foregoing table were evaporated to dryness in vacuo at 40° C. The product was thereafter dried using methyl-ethyl ketone. The dry residue was stirred in 710 ml. of boiling acetone, following which the solution was cooled in ice for a period of about 1 hour and filtered to remove ammonium chloride and any undissolved 5-fluorouracil present therein. Evaporation of the filtrate to dryness in vacuo gave a product having $$E^{280}_{260} = 1.092$$

equivalent to 29.5 grams of 2′-deoxy-5-fluorouridine and 3.9 grams of 5-fluorouracil. This product was dissolved in 18 ml. of boiling butyl acetate.

The butyl acetate solution, thus obtained, was combined with butyl acetate solutions containing mixtures of 2′-deoxy-5-fluorouridine and 5-fluorouracil, which were obtained by similar processing. The combined solution was evaporated to dryness and the residue was dried at a temperature of 60° C. in vacuo to yield 188.5 grams of a yellow colored powder, ratio $$E^{280}_{260} = 1.139$$

corresponding to 152.5 grams of 2′-deoxy-5-fluorouridine. This product was suspended in 200 ml. of pyridine, cooled in an ice bath, and treated with 280 ml. of acetic anhydride. During the addition of acetic anhydride, the suspension was cooled and stirred. The reaction proceeded exothermically with the evolution of heat and the dissolution of the suspended 2′-deoxy-5-fluorouridine. The solution, thus obtained, was maintained at room temperature overnight during which time a crystalline precipitate formed. This precipitate was separated from the mother liquor by decantation. The product was slurried with about 60 ml. of ether, filtered, washed with ice water and dried in vacuo at a temperature of about 60° C. There was obtained 88.0 grams of 5-fluoro-3′,5′-di-O-acetyl-2′-deoxyuridine melting at 152 to 153° C.

The mother liquor, which remained after the 5-fluoro-3′,5′-di-O-acetyl-2′-deoxyuridine had been removed, was poured with stirring into 2800 ml. of an ice and water mixture to yield an oil which subsequently became crystalline. The product was washed with ice water, then with cold ether and dried at 60° C. in vacuo. Recrystallization of the product from ethyl alcohol yielded 87.0 grams of white crystalline 5-fluoro-3′,5′-di-O-acetyl-2′-deoxyuridine. Further recrystallization from the combined aqueous and alcoholic mother liquors and ether washings yielded an additional 12.3 grams of the crystalline diacetyl compound.

The first obtained 88.0 grams of 5-fluoro-2′-deoxy-3′,5′-di-O-acetyluridine was converted into 2′-deoxy-5-fluorouridine in the following manner. 88.0 grams of the diacetyl derivative were suspended in 450 ml. of ice cold methanol and 150 ml. of ice cold saturated solution of hydrogen chloride gas in methanol was added

| Eluent | Fractions | Total Absorbance (pH 14) | | Average Ratio, 280 mμ/ 260 mμ | Grams | | | |
|---|---|---|---|---|---|---|---|---|
| | | 260 mμ | 280 mμ | | TDR | T | FUDR | FU |
| pH 7.4 | 1–14 | | | | | | | |
| pH 7.4 | 15–31 | 3,708 | 2,680 | 0.72 | 143.0 | | | |
| pH 7.4 | 32–39 | 2,947 | 2,766 | 0.94 | 81.5 | 23.0 | | |
| pH 7.4 | 40–49 | 1,980 | 2,930 | 1.48 | | 58.3 | | |
| pH 7.4 | 50–63 | | | | | | | |
| pH 5.45 | 64–82 | 819.4 | 745 | 0.91 | | | 33.8 | |
| pH 5.45 | 83–89 | 2,259 | 2,210 | 0.98 | | | 88.7 | 3.8 |
| pH 5.45 | 90–95 | 1,440 | 1,730 | 1.201 | | | 49.6 | 12.0 |
| pH 5.45 | 96–100 | 935 | 1,480 | 1.583 | | | 24.1 | 18.4 |
| pH 5.45 | 101–105 | 804 | 1,721 | 2.144 | | | 10.6 | 29.1 |
| pH 5.45 | 106–116 | 1,162 | 3,060 | 2.625 | | | 2.5 | 59.2 |

TDR = Thymidine.
T = Thymine.
FUDR = 2′-deoxy-5-fluorouridine.
FU = 5-fluorouracil.

thereto. Upon shaking the suspension at room temperature for a period of about 75 minutes, a clear solution was obtained. The solution was evaporated in vacuo at a temperature of about 30° C. to yield a colorless froth which was subsequently dissolved in 200 ml. of ethanol. Gradual addition of 200 ml. of petroleum ether to the ethanol solution obtained, accompanied by scratching and seeding with pure 2'-deoxy-5-fluorouridine, brought about crystallization. Crystallization of the product from solution was permitted to continue for several hours. The crystalline product was separated from solution by filtration and it was washed first with a mixture containing equal volumes of ethanol and petroleum ether and subsequently, with petroleum ether only. The product was dried, in vacuo, at 60° C., and 39.0 grams of 2'-deoxy-5-fluorouridine, melting at 147° C. to 148° C. were obtained. An additional crop of crystalline 2'-deoxy-5-fluorouridine was obtained by permitting the mother liquor and washings to stand at room temperature, and adding petroleum ether thereto. The total yield of 2'-deoxy-5-fluorouridine obtained from the diacetyl derivative was 61.83 grams, corresponding to 94.1% of theory.

Recrystallization of the first obtained 39.0 grams of 2'-deoxy-5-fluorouridine from 1950 ml. butyl acetate yielded 29.3 grams of 2'-deoxy-5-fluorouridine melting at 150° C. to 151° C. An additional crop of crystalline 2'-deoxy-5-fluorouridine was obtained upon concentration of the butyl acetate mother liquor.

Example 3

This example is included in the present specification to show the manner in which 5-fluoro-2'-deoxy-3',5'-di-O-acetyluridine is hydrolyzed with an alkali.

A fraction (comparable to fractions 96 to 100 used in Example 2) which contained a mixture of 2'-deoxy-5-fluorouridine and 5-fluorouracil was diacetylated by the procedure described in Example 2. A powdery product was isolated from the reaction mixture, also by the method described in Example 2. Thereafter, 1000 grams of the product, thus obtained, was slurried with 1500 ml. of anhydrous alcohol. To this slurry there was added with stirring, 2000 cc. of a 10% solution of sodium methoxide in methanol. A clear solution was obtained. After standing overnight at a temperature of about 5° C., the pH of the solution was adjusted to 6.0 using a 10% solution of hydrogen chloride in methanol. The solution was then evaporated to dryness and the hard residue obtained was broken up by the addition of 2 liters of hot acetone. The mixture was filtered and the filter-cake was dried in vacuo and ground and extracted for 10 minutes using 20 liters of boiling acetone. The mixture was filtered hot, leaving a filter-cake of 181.8 grams (containing 34.0 grams of 2'-deoxy-5-fluorouridine). This filter-cake was extracted once again using boiling acetone. The acetone extracts from this step were combined with the original acetone extracts and the combined acetone extracts were concentrated, in vacuo, at a temperature of about 35° C., to a volume of about 1600 cc. Crystallization started to take place at such concentration. A heavy slurry was obtained by slowly adding, with stirring, 300 cc. of petroleum ether to the concentrated solution. The slurry was then cooled and subsequently filtered to yield 452.3 grams of crystalline 2'-deoxy-5-fluorouridine in a relatively pure state. The mother liquor was further concentrated in vacuo to yield an additional 182.0 gram crop of crystalline 2'-deoxy-5-fluorouridine. Further concentration of the mother liquor yielded a third crop of crystalline 2'-deoxy-5-fluorouridine in the amount of 61.0 grams.

The total yield of 695.3 grams of crystalline 2'-deoxy-5-fluorouridine represents a yield of 97.7% theory, based on the quantity of 2'-deoxy-5-fluorouridine present in the 1000 grams of product originally employed.

I claim:
1. 5-fluoro-2'-deoxy-3',5'-di-O-acetyluridine.
2. A process for isolating 2'-deoxy-5-fluorouridine from a crude product containing 2'-deoxy-5-fluorouridine in admixture with 5-fluorouracil which comprises reacting said crude product with an acetylating agent selected from the group consisting of acetic anhydride and acetyl chloride in the presence of an alkali, isolating 5-fluoro-2'-deoxy-3',5'-di-O-acetyluridine from the reaction mixture and subjecting the said 5-fluoro-2'-deoxy-3',5'-di-O-acetyluridine to hydrolysis.
3. The process of claim 2 wherein the acetylating agent is acetic anhydride and the alkali is pyridine.
4. The process of claim 3 wherein the reaction is carried out in the presence of methylene chloride.

References Cited in the file of this patent

UNITED STATES PATENTS 2,881,164    Kissman et al. _____ Apr. 7, 1959

OTHER REFERENCES

Kissman et al.: J.A.C.S., vol. 80, pages 5559–64 (1958).
Hoffer et al.: J.A.C.S., vol. 81, pages 4112–13 (1959).